United States Patent Office 3,211,574
Patented Oct. 12, 1965

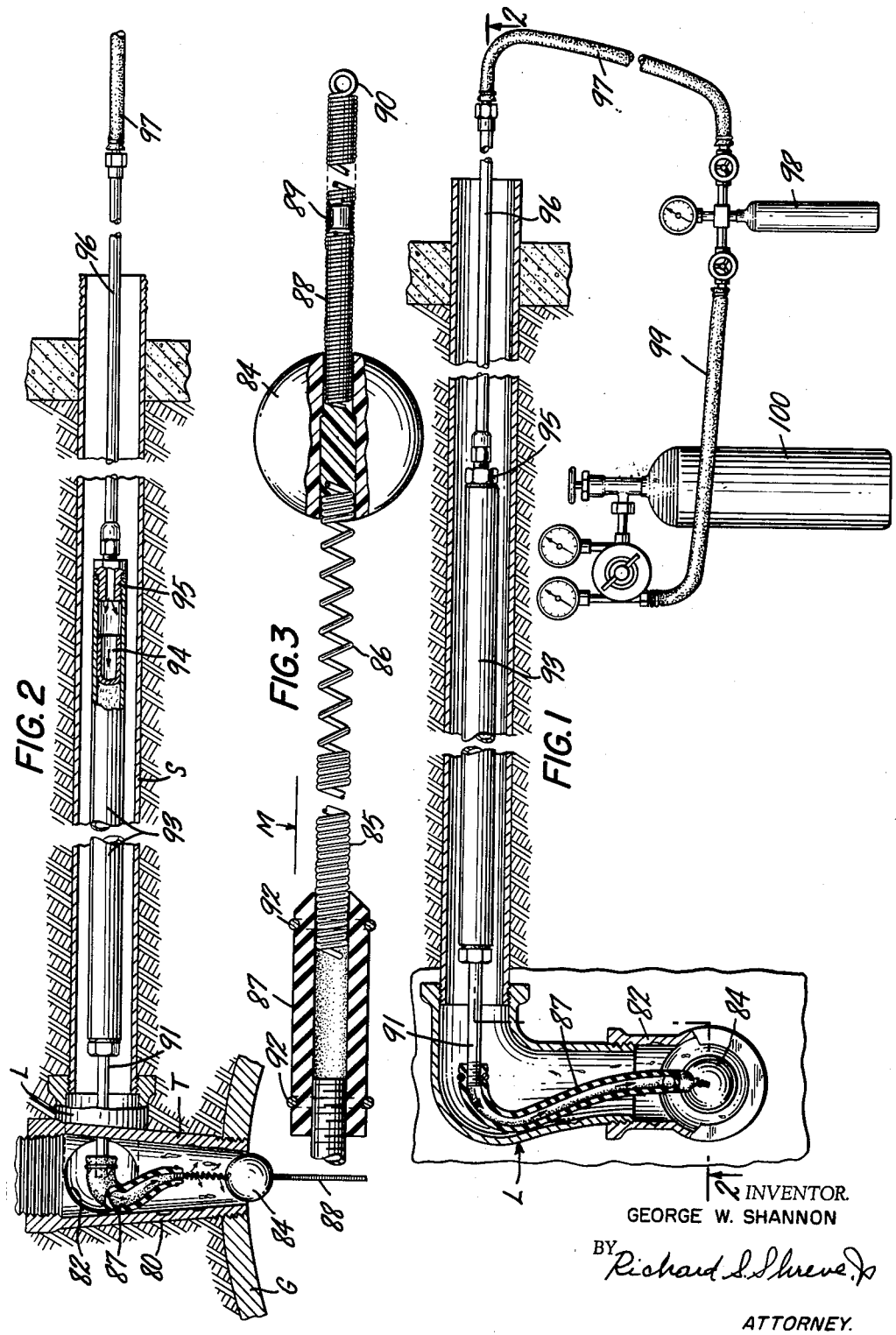

3,211,574
REMOTE PLASTIC LINING OF PIPE ANGLE
George W. Shannon, West Orange, N.J., assignor to Bonded Products, Inc., Orange, N.J., a corporation of Illinois
Filed Aug. 16, 1962, Ser. No. 217,336
12 Claims. (Cl. 117—97)

This invention relates to remote plastic lining of pipe of the character described in the copending application of Hight et al., Serial No. 177,665 filed March 5, 1962, and more particularly to the remote lining of pipe angles, such as an elbow or tee fitting at the far end of a pipe by operation through the open rear end of the pipe.

The invention according to said copending application serves to line the service pipe extending from a gas main. However such service pipes are generally rectilinear or straight, and connected to the gas main by a tee fitting. When a swing joint is provided, an elbow fitting is interposed between the service pipe and the tee. These bends are generally subject to the same amount of corrosion as the straight portion.

It is therefore the main object of the present invention to line the interior of pipe angles or bends.

According to the present invention, an applicator and a flexible pusher are propelled along inside the cavity on around inside the angle fitting to bring the applicator to the far end thereof, a charge of lining material is passed into the exposed end of the cavity and propelled on against the applicator to load the same, and the flexible pusher is withdrawn to pull the applicator in the reverse direction to spread the charge and line the inside of said angle fitting. Preferably a flexible feeler extends ahead of the applicator to bend and enter the angle fitting.

In the drawings:

FIGURE 1 is a horizontal section through a gas main and service line showing apparatus according to, and for carrying out the method of the present invention;

FIGURE 2 is a vertical section taken along the line 2—2 of FIGURE 1; and

FIGURE 3 is an enlarged view of the applicator employed in the apparatus shown in FIGURES 1 and 2.

In this form, the gas main G is provided with a street tee fitting T having a vertical leg 80 converging with a slight taper into the main. The top of the leg 80 is an access opening which is normally plugged. The side branch 82 of the tee is connected to a street elbow L for a swing joint to the service line S. The corrosion may be so extreme that the service lines and tee and elbow fittings become cavities in the earth.

For lining the connection from the service line S to the gas main G, an applicator M is provided, which comprises a stopper 84 preferably of rubber, but which may be made of wood, plastic or metal. The diameter of the stopper is about one quarter of an inch less than the smallest opening of any fitting it must pass through.

The stopper 84 is secured to the leading end of a flexible pusher 85, preferably wound as a helical coil of music grade wire on a three eighth inch mandrel of 16 turns to the inch B & S gauge #22. This spring has a foraminous portion expanded to preferably four turns per inch for a distance of two inches.

The other or trailing end of the spring 85 is secured in the leading end of a rubber hose 87, preferably five-sixteenth inch ID, minimum one eighth inch wall, of a length determined by the length of sweep center lines of different size fittings attached to the service line S. The combined length of the spring 85 and the hose 87 is sufficient to allow the stopper 84 to just enter the gas main G.

Secured to the forward or leading side of the stopper 85 is a flexible feeler or guide spring 88, preferably helical coil wound on a one-quarter inch mandrel of 28 turns per inch, B & S gauge #30. The front end of the guide spring 88 is rounded off, preferably by a two loop coil 90 over the center thereof. The length of the guide spring 88 is determined by the sweep center lines of different size pipe fittings. When two fittings are used as on a swing joint a weight such as a lead slug 89 is preferably inserted into the spring 88 about one and one half inches from the front end thereof.

The stopper is preferably bored to receive tightly the guide spring 88 and counterbored to receive tightly the pusher spring 85. Prior to insertion the void is filled with a thermal setting hard curing plastic, to secure the spring 85 to the spring 88 and acting as a plug between the same.

The trailing end of the hose 87 is secured over the leading end of a pipe nipple 91, preferably one-eighth inch IDS, which supplies lining material thereto. The respective ends of the hose are secured to their inserts by binding straps 92.

Secured to the trailing end of the nipple 91 is a cylinder 93, of a length and diameter to contain a charge of lining material sufficient to line the street fittings L and T. This cylinder contains a floating piston 94 shown in FIGURE 2. The trailing end of the cylinder 93 in the form shown is connected by a reducing coupling 95 to a thrust pipe 96, the trailing end of which is connected by a supply hose 97 to a charging cylinder 98, in turn connected by a hose 99 to a supply tank 100. We have found that the thrust pipe 96 may be omitted, and the hose 97 connected directly to the cylinder 93.

In operation, after the cylinder 93 has been loaded with a charge of lining material, preferably a thixatropic epoxy resin as disclosed in said copending application, and the piston inserted in the intake end thereof, and the charging cylinder has been filled from the supply tank 100, the applicator M is inserted in the open end of the service pipe S. The guide spring 88 is followed in succession by the stopper 84, pusher spring 85, hose 87, cylinder 93 and pusher pipe 96 or hose 97 either of which constitutes means for pushing or passing a charge of lining material contained in the cylinder 93, into the exposed end of the service line S.

The weight of the lead plug 89 is a little more than just sufficient to bend the guide spring 89 to bring the end loop 90 nearer to the bottom of the pipe. When the end 90 reaches the elbow L, it follows around the curvature thereof into the tee branch 82. The curvature of the pipe also guides the stopper 84 around the inside of the elbow, the pusher spring 85 and the hose 87 flexing in succession to follow.

Further thrust on the pusher pipe 96 causes the end 90 to pass over the tee leg 80, and the weight of the lead plug 89 causes the guide spring 88 to drop down into the tee leg 80, taking the stopper 84, pusher spring 85 and hose 87 along with it in succession. The combined length of the guide spring 85 and the hose 87 is just sufficient to let the stopper reach the bottom of the tee leg 80 and enter the gas main G with the guide spring 88 hanging down inside the gas main.

The charging cylinder 98 is released, and fluid under pressure therefrom passes through hose 97 and thrust pipe 96 into the cylinder 93. This causes the piston 94 to expel the charge of lining material through nipple 91, hose 87 and pusher spring 85 to the expanded section 86. The charge of lining material is discharged through the openings between the expanded coils into the tee leg 80 above the stopper 84 and fills the leg 80. The piston 94 therefore constitutes a means for propelling the charge along inside the service pipe S on into said angle cavity. The thrust pipe 96 is then pulled outward, drawing the stopper 84 therewith, the rear surface thereof diverging from the flexible member 87 and away from the exposed end of the service line S, thereby, spreading the charge of lining material over the inside surface of the tee T and elbow L. The charge is sufficient to coat a short length of the inner end of the service pipe S as well.

What is claimed is:

1. Method of lining an angle cavity on the inner end of an elongated tubular cavity having the outer end thereof exposed, which comprises inserting an applicator sufficiently short to pass around inside and through said angle cavity and a flexible pusher in tandem through said exposed end, propelling said flexible pusher along inside the elongated cavity until said applicator passes into said angle cavity and bends said pusher to pass on around inside said angle cavity to bring said applicator to the far end thereof, passing a charge of lining material into said exposed end, propelling said charge along inside the elongated cavity on into said angle cavity to surround said bent flexible pusher and impinge against the rear of said applicator to load the same and fill the entire annular space between said bent flexible pusher and the wall of said angle cavity for at least a portion of the common length thereof, and propelling said flexible pusher in the reverse direction to pull said applicator toward said exposed end to spread the charge and line the inside of said angle cavity.

2. Method of lining a gas service line having an exposed outer end and leading from a gas main through an angle fitting having an entrance orifice smaller than said service line and all embedded in the earth except said outer end, which comprises inserting through said exposed outer end an applicator of a diameter to plug said orifice and sufficiently short to pass around inside said angle fitting and a flexible pusher in tandem with said applicator, propelling said flexible pusher along inside said service line on around inside said angle fitting to bring said applicator to said gas main to plug said orifice, passing a charge of lining material into said service line ahead of said exposed end, propelling said charge along inside through said angle fitting until it reaches said applicator to load the same, and thereafter propelling said flexible pusher in the reverse direction toward said exposed end to unplug said orifice and spread the charge to line the inside of said angle fitting and said service line.

3. Method of lining an angle fitting on the inner end of an elongated tubular cavity having the outer end thereof exposed, which comprises inserting in tandem through said exposed end a flexible feeler, an applicator of larger diameter than said feeler, and a flexible pusher of smaller diameter than said applicator, propelling said pusher along inside the cavity until said feeler finds the angularity of said fitting, and guides said applicator so that it enters said angle fitting and said pusher follows around inside the fitting to push the applicator to the far end thereof, passing a charge of lining material into said exposed end, propelling said charge along inside the cavity on against the applicator to load the same, and propelling said pusher in the reverse direction toward said exposed end to pull said applicator rearward to spread the charge and line the inside of said angle fitting.

4. Method of lining a pipe tee extending vertically from a gas main and connected to the inner end of an elongated tubular cavity having the outer end thereof exposed, which comprises inserting through said exposed end a flexible feeler, an applicator of larger diameter connected to said feeler, and a flexible pusher of smaller diameter connected to said applicator, propelling said pusher along inside said cavity as said feeler drops and slides along the bottom of said cavity until it reaches the pipe tee and falls down thereinto toward the main, and said feeler guides said applicator so that it enters the pipe tee and said flexible pusher follows down inside the tee to push the applicator to the bottom thereof, passing a charge of lining material into said exposed end, propelling said charge on down inside said tee against the applicator to load the same, and propelling said pusher in the reverse direction toward the exposed end to pull the applicator rearward to spread the charge and line the inside of said pipe tee fitting.

5. Method of lining an angle fitting on the inner end of an elongated tubular cavity having the outer end thereof exposed, which comprises inserting in tandem through said exposed end an applicator and a flexible tube, propelling said tube along inside the cavity around inside said angle fitting to bring said applicator to the far end thereof, propelling a charge of lining material along inside said tube to discharge through a foraminous portion of said tube ahead of said applicator to fill a portion of said fitting and load said applicator, and propelling said tube in the reverse direction to pull said applicator out of said angle fitting to spread the charge and line the inside of said angle fitting.

6. Method of lining an angle fitting on the inner end of an elongated tubular cavity having the outer end thereof exposed, which comprises inserting in tandem through said exposed end an applicator, a flexible tube, a cylinder containing a piston and a charge of lining material, and a supply tube; propelling said tandem elements along inside the cavity to propel said flexible tube around inside said angle fitting to bring said applicator to the far end thereof, applying fluid under pressure to said supply tube against said piston to discharge said lining material through a foraminous portion of said flexible tube ahead of said applicator to fill a portion of said fitting and load said applicator, and propelling said tandem elements in the reverse direction to pull said applicator out of said angle fitting to spread the charge and line the inside of said angle fitting.

7. Apparatus for lining an angle fitting on the inner end of an elongated tubular cavity having the outer end thereof exposed, which comprises an applicator including a stopper and a flexible pusher connected to the rear of said stopper and inserted in tandem through said exposed end, a relatively rigid elongated thrust member connected to the rear of said flexible member for propelling said applicator along inside the cavity on around inside said angle fitting to bring said applicator to the far end thereof, said stopper having a rear surface diverging from said flexible member away from said exposed end to form a spreader.

8. Apparatus for lining an angle fitting having a reduced entrance orifice and an exit orifice mounted on the inner end of an elongated tubular cavity having an exposed outer end, which comprises a resilient plug sufficiently short to pass around inside and through said angle fitting and of a diameter to substantially stop said entrance orifice, a helical spring secured to the rear end of said plug and inserted through said exposed end in tandem with said plug for propelling the same along inside said cavity and on around inside said angle fitting to bring said plug into engagement with said entrance orifice, means for pushing a charge of lining material into said exposed end, means connected to and carried by said pushing means for propelling said charge along inside said angle fitting on outside of and surrounding said spring until said charge reaches and impinges against said plug and fills the entire annular space between said spring and the wall of said fitting, said spring being operable in the reverse direction to pull said plug toward said exposed end to spread the charge and line the inside of said angle fitting.

9. Apparatus for lining an angle fitting on the inner end of an elongated tubular cavity having the outer end thereof exposed, which comprises a flexible feeler, an applicator connected to the rear of said feeler, and a flexible pusher connected to the rear of said applicator in tandem inserted through said exposed end a relatively rigid member for propelling said applicator along inside the cavity until said feeler finds and enters said angle fitting and said pusher follows around inside the fitting to push the applicator to the far end thereof.

10. Apparatus for lining an angle fitting on the inner end of an elongated tubular cavity having the outer end thereof exposed, which comprises a flexible feeler, an applicator connected to the rear of said feeler, and a flexible pusher connected to the rear of said applicator, a relatively rigid member for propelling said applicator along inside the cavity until said feeler finds and enters said angle fitting and said pusher follows around inside the fitting to push the applicator to the far end thereof, said flexible feeler being secured to said applicator in axial alignment with said flexible pusher and being of sufficient resiliency to drop toward the bottom of said cavity, and being of sufficient weight for the forward end thereof to drop by gravity into said angle fitting.

11. Apparatus for lining an angle fitting on the inner end of an elongated tubular cavity having the outer end thereof exposed, which comprises an applicator and a flexible tube joined to the rear of said applicator and having a foraminous portion near the joint, said applicator being of larger diameter than said flexible tube and having a rear surface diverging forwardly from said tube to form a spreader, an elongated substantially rigid member connected to the rear of said tube for propelling said tube along inside the cavity around said angle fitting to bend said flexible tube and bring the applicator to the far end thereof, and means for propelling a charge of lining material along inside said tube to discharge through said foraminous portion of said tube ahead of said applicator to fill a portion of said fitting, said rigid member being operable for propelling said tube in the reverse direction to pull said applicator out of said fitting to spread the charge and line the inside of said angle fitting.

12. Apparatus for lining an angle fitting on the inner end of an elongated tubular cavity having the outer end thereof exposed, which comprises an applicator, a flexible tube joined to the rear of said applicator and having a foraminous portion near the joint, a cylinder connected to the rear end of said flexible tube, a piston in said cylinder, said cylinder being adapted to contain a charge of lining material ahead of said piston, an elongated straight rigid tube connected to the rear end of said cylinder, and a supply of fluid under pressure connected to the rear end of said elongated straight rigid tube.

References Cited by the Examiner

UNITED STATES PATENTS

| | | | |
|---|---|---|---|
| 1,088,459 | 2/14 | Shade | 15—104.30 X |
| 1,858,997 | 5/32 | Lewin | 15—104.30 X |
| 1,871,798 | 8/32 | King | 15—30 XR |
| 2,090,174 | 8/37 | Albright | 15—104.30 X |
| 2,608,421 | 8/52 | Schnepp | 15—104.30 X |
| 2,758,917 | 8/56 | Popp | 15—104.30 X |

FOREIGN PATENTS 219,361  8/42  Switzerland.

RICHARD D. NEVIUS, *Primary Examiner.*